(12) United States Patent
Hamley (10) Patent No.: US 6,201,857 B1
(45) Date of Patent: Mar. 13, 2001

(54) COMBINATION TELEPHONE AND VOICE-MAIL TRANSCEIVER

(75) Inventor: James Pearce Hamley, Mill Creek, WA (US)

(73) Assignee: Six Sigma, Ltd., Mill Creek, WA (US)

( * ) Notice: Subject to any disclaimer, the term of this patent is extended or adjusted under 35 U.S.C. 154(b) by 0 days.

(21) Appl. No.: 08/406,668

(22) Filed: Mar. 20, 1995

(51) Int. Cl.[7] ................................................. H04M 1/65
(52) U.S. Cl. ................. 379/88.1; 379/88.12; 379/88.18; 379/88.23; 379/88.28
(58) Field of Search ................................ 379/67, 88, 89, 379/69, 101

(56) References Cited

U.S. PATENT DOCUMENTS

| | | | |
|---|---|---|---|
| 4,790,003 | * | 12/1988 | Kepley et al. ........................... 379/88 |
| 4,998,272 | * | 3/1991 | Hawkins, Jr. et al. ................. 379/88 |
| 5,003,576 | * | 3/1991 | Helferich ............................... 379/88 |
| 5,172,404 | * | 12/1992 | Hashimoto ............................. 379/67 |
| 5,274,696 | * | 12/1993 | Perelman ............................... 379/89 |
| 5,313,516 | * | 5/1994 | Afshac .................................. 379/89 |

OTHER PUBLICATIONS

AMIS–Analog Protocol. Version 1 Issue 2, Feb. 1992.*
"High Tech Phone Does the Dialing," The Fairfax Journal, Aug. 19,1992 pp. C4.*
"What hath (net) god wrought" The Fairfax Journal, Feb. 21, 1995 pp. B1, B2.*
Octel User Reference Manual, Nov. 1994 pp. 7,8, 23–26.*

* cited by examiner

Primary Examiner—Daniel S. Hunter (57) ABSTRACT

A telephone control unit 12 allows the calling party to optionally select either a standard telephone call or a voice-mail transmission. If a voice-mail message is selected, the system allows the user to dictate the message which is then analog-to-digital converted and stored in memory. Once the user selects the receiving party's telephone number, the system dials the number and sends a header signal to the receiving unit indicating that a voice-mail transmission is desired. If the receiving unit detects the voice-mail header, it sends an acknowledgment signal, whereby the transmitting unit digitally compresses the stored voice-mail message and transmits the compressed message through the telephone network to the receiving site. The receiving site then flashes an indicator to the user that voice-mail is waiting. Upon a user replaying a voice-mail signal, the receiving site decompresses and digital to analog converts the signal for reproduction by the user.

31 Claims, 5 Drawing Sheets

COMBINATION TELEPHONE AND VOICE-MAIL TRANSCEIVER

BACKGROUND OF THE INVENTION

The present invention relates to the telephone art and, in particular, to a combination telephone and voice-mail transceiver.

Answering machines are commonly available devices which allow the receiving party of a telephone call to elect to store an incoming caller's message to an electronic storage medium. Thus, if the receiving party is not available to take the call, or if he or she is available yet elects not to directly talk with a calling party, they may simply allow the answering machine to store the caller's voice message.

In addition, voice-mail systems have been created which allow a calling party the opportunity to record for later playback by the receiving party a given communication. Voice-mail systems, however, are normally either telephone company provided or are provided by companies on private branch exchanges. Thus, they are not generally available to the public, to the same level that answering machines have become commonplace. In addition, with telephone company provided voice-mail, as with a standard answering machine message, the calling party spends total message real time on the telephone line while the message for the receiving party is being recorded, thereby incurring a billing for the entire real time use of the telephone network.

As more people become familiar with voice-mail, there is a growing tendency to utilize its services, but for the fact that it is only available on PBX and via telephone company provided service as described above. It would be desirable, therefore, if a calling party calling from a standard office or residential telephone unit would be given the opportunity to select making a standard call in real time or recording and transmitting a voice-mail message to his or her receiving party.

In addition, it would be desirable if the calling terminals provided voice-mail reception capabilities with a convenient notice and access by the telephone terminal users.

SUMMARY OF THE INVENTION

It is an object of this invention, therefore, to provide a telephone control unit which provides, in addition to standard telephone transmit and receive capabilities, the ability to transmit and receive voice-mail messages over the telephone network.

It is a further object of the present invention to provide the above telephone control unit wherein messages which are transmitted are first compressed to thereby reduce the real time telephone network phone usage and thereby reduce cost of operation for the telephone control unit user.

These and other objects of the invention will become apparent upon review of the specification and claims which follow.

In summary, a telephone control unit is adapted for both transmitting and receiving voice-mail messages. It comprises a voice-mail transmitter which includes a detector that detects that a voice-mail message is to be sent. The transmitter further includes storage capability to store the voice-mail messages in memory. A compression means compresses the stored voice-mail message.

A predetermined header is then attached to the compressed voice-mail message. The header and compressed voice-mail message are then transmitted over the telephone network to a user-dialed voice-mail receiver. The voice-mail receiver includes a receiver for receiving the message over the telephone network. A detector then detects the presence of a predetermined voice-mail header in the message and, in response to header detection: 1) strips off the voice-mail header; 2) decompresses the voice-mail message and 3) transduces the voice-mail message upon user-desired replay.

In the preferred implementation of the invention, the transmitter further includes an analog-to-digital converter for converting the voice-mail message to a digital format. The digital signal is then stored and processed through a digital compression algorithm before being transmitted over the telephone network with the attached header signal. The receiver further includes a digital-to-analog converter which converts the received digital messages from the transmitter over the telephone network into an analog signal format.

DETAILED DESCRIPTION

Figure 1:
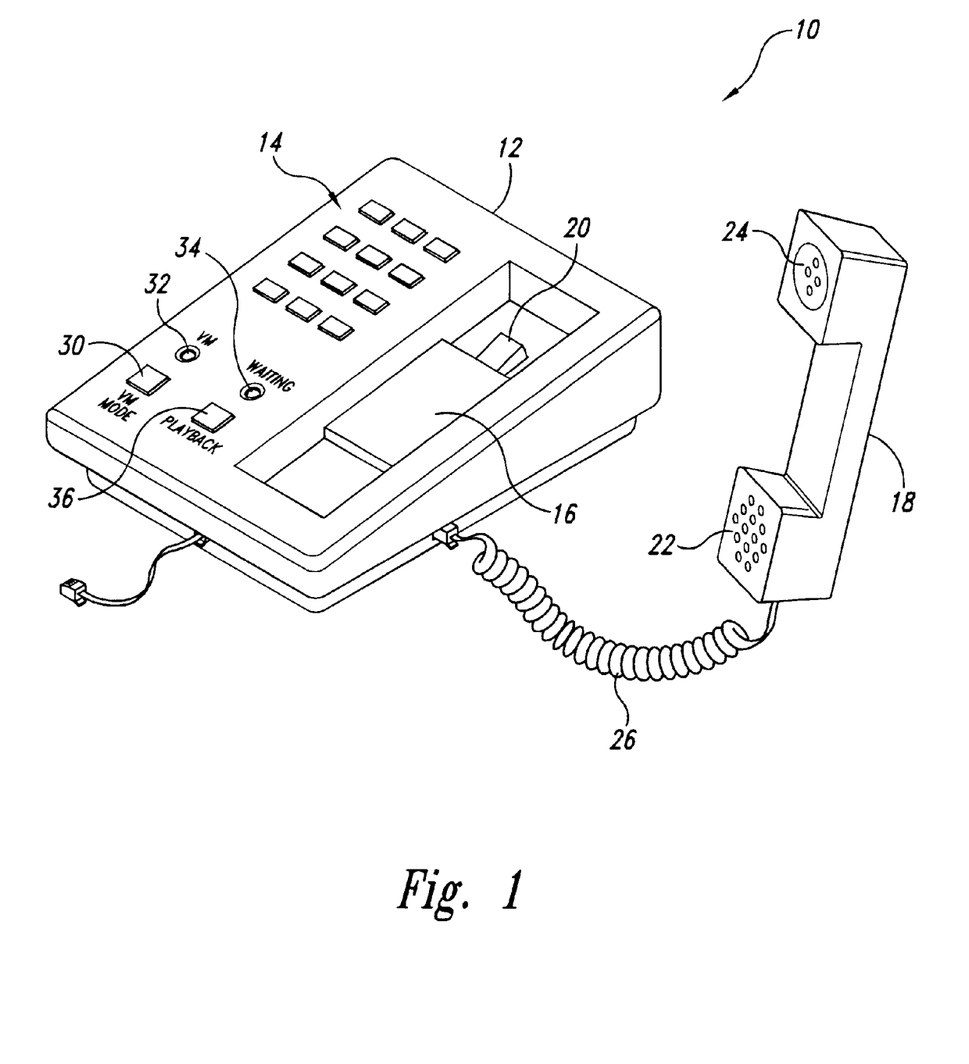
FIG. 1 if a perspective view of the preferred embodiment of the inventive telephone control unit and illustrates the use of a voice-mail mode switch, indicator light, and a voice-mail waiting indicator light.

FIG. 1 illustrates a perspective view of the preferred embodiment of the telephone control unit indicated generally at 10, which allows for the transmission and reception of voice-mail. Shown is a base unit 12 which contains the principal electronics for the voice-mail transceiver 10. On the operating base plate of the base unit 12 is formed a conventional telephone keypad arrangement 14 which may include standard speed dialing pads. Formed in the upper surface of base unit 12 is a cradle recess 16 which is adapted to receive a conventional handset 18. Provided within the cradle recess 16 is a standard hook switch 20. The handset 18 includes a conventional microphone 22 in its mouthpiece and a conventional speaker 24 at its earpiece. The handset 18 connects to the base unit 12 through a conventional coiled cord 26.

As is described more thoroughly herein below, the present telephone control unit 10 allows a user to both transmit and receive voice-mail messages. Thus, provided on the faceplate of base unit 12 is a switch 30 which the user activates when desirous of placing a voice-mail transmission. To reflect that the telephone control unit 10 is in the voice-mail mode, a provided indicator 32 (which, preferably, is a conventional light-emitting diode), lights to indicate voice-mail mode.

In addition, also provided in the faceplate of base unit 12 is an indicator 34 (also, preferably, a light emitting diode) which lights to indicate to a user that he or she has voice-mail waiting to be heard. Should the user desire to replay his or her voice-mail, a provided switch 36 (also in the faceplate of base unit 12) is activated by the user to thereby allow message replay.

The telephone control unit 10 in the conventional manner connects via standard cord 40 and module plug 42 to the telephone network.

Figure 2:
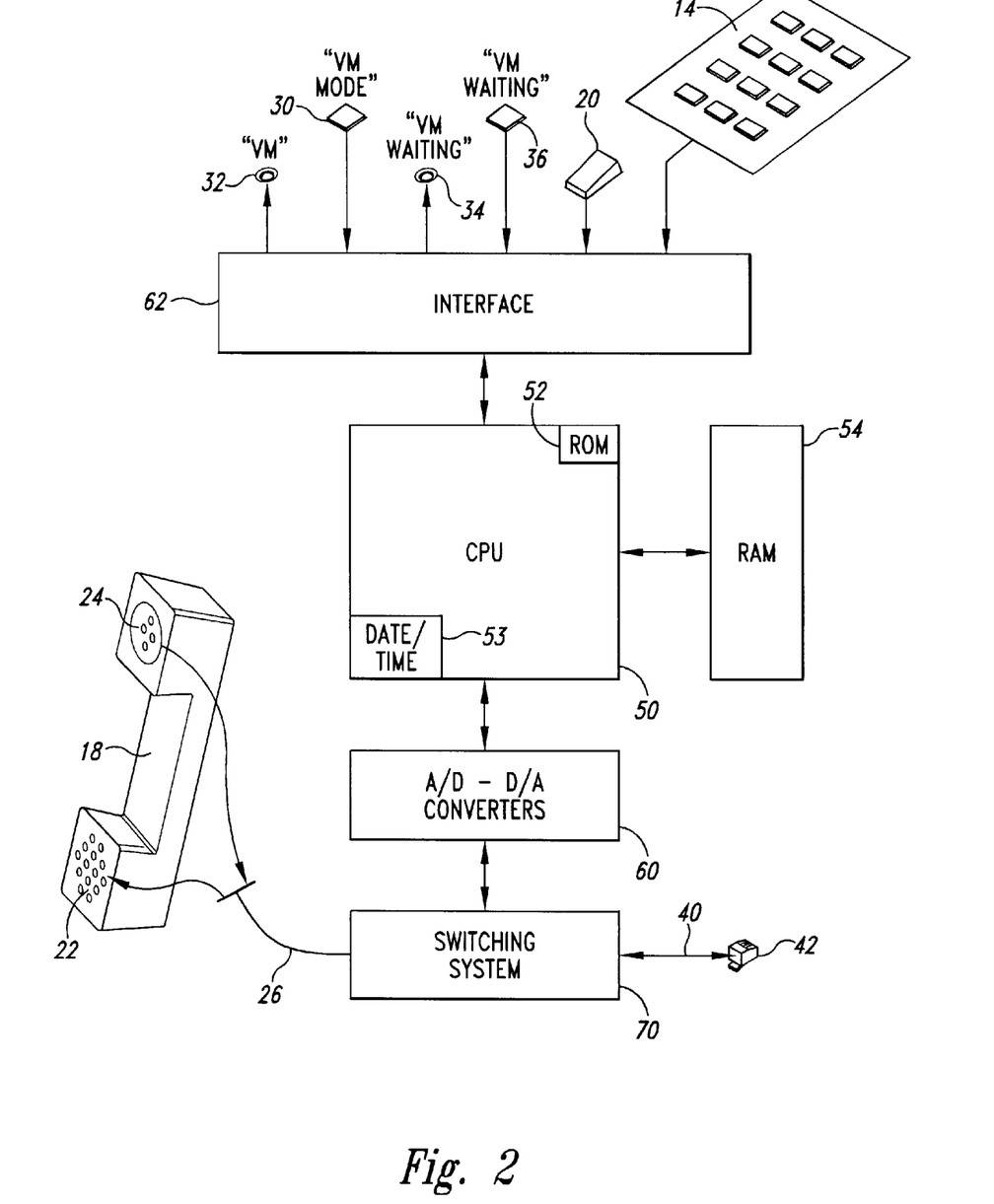
FIG. 2 is a block diagram illustrating the principal components, and their interrelationship, of the preferred embodiment of the voice-mail transceiver.

FIG. 2 is a block diagram which illustrates the preferred construction of the voice-mail transceiver shown in FIG. 1. As with FIG. 1, shown is a handset 18 which includes a microphone 22 in the handset and a speaker 24 in the ear portion of the handset. The handset connects to the base unit, indicated generally at 12, by means of a cable 26.

Provided on the base unit 12 are a voice-mail mode switch 30, a voice-mail on indicator 32, a voice-mail waiting indicator 34 and a voice-mail replay switch 36.

Also provided on base unit 12 is a standard keypad 14 which may also include speed dialing pads.

The connection from the base unit 12 to the telephone network is via a cable 40 and a standard modular plug 42.

At the heart of the voice-mail transceiver control unit is a central processing unit (CPU) 50. In the conventional manner, central processing unit 50 includes read-only memory (ROM) 52. A program which resides permanently on the ROM 52 provides the instruction set for the CPU allowing it to power-up and perform many of the functions described below.

The CPU 50 has associated random access memory (RAM) 54 which CPU 50 uses for the purpose of both reading and writing digital signals to perform the functionality described below. Also associated with CPU 50 is a date/time module 53 used by CPU 50 to date and time tag messages as described below. CPU 50 is connected to the handset 18 and to the cord 40 and connector module 42 through an analog-to-digital (A/D)/digital-to-analog (D/A) converter module 60 and a switching system 70.

Further, the CPU 50 connects through an interface circuit 62 to the voice-mail on indicator 32, voice-mail mode switch 30, voice-mail waiting indicator 34, voice-mail replay switch 36 and the keypad 14.

Figure 3A:
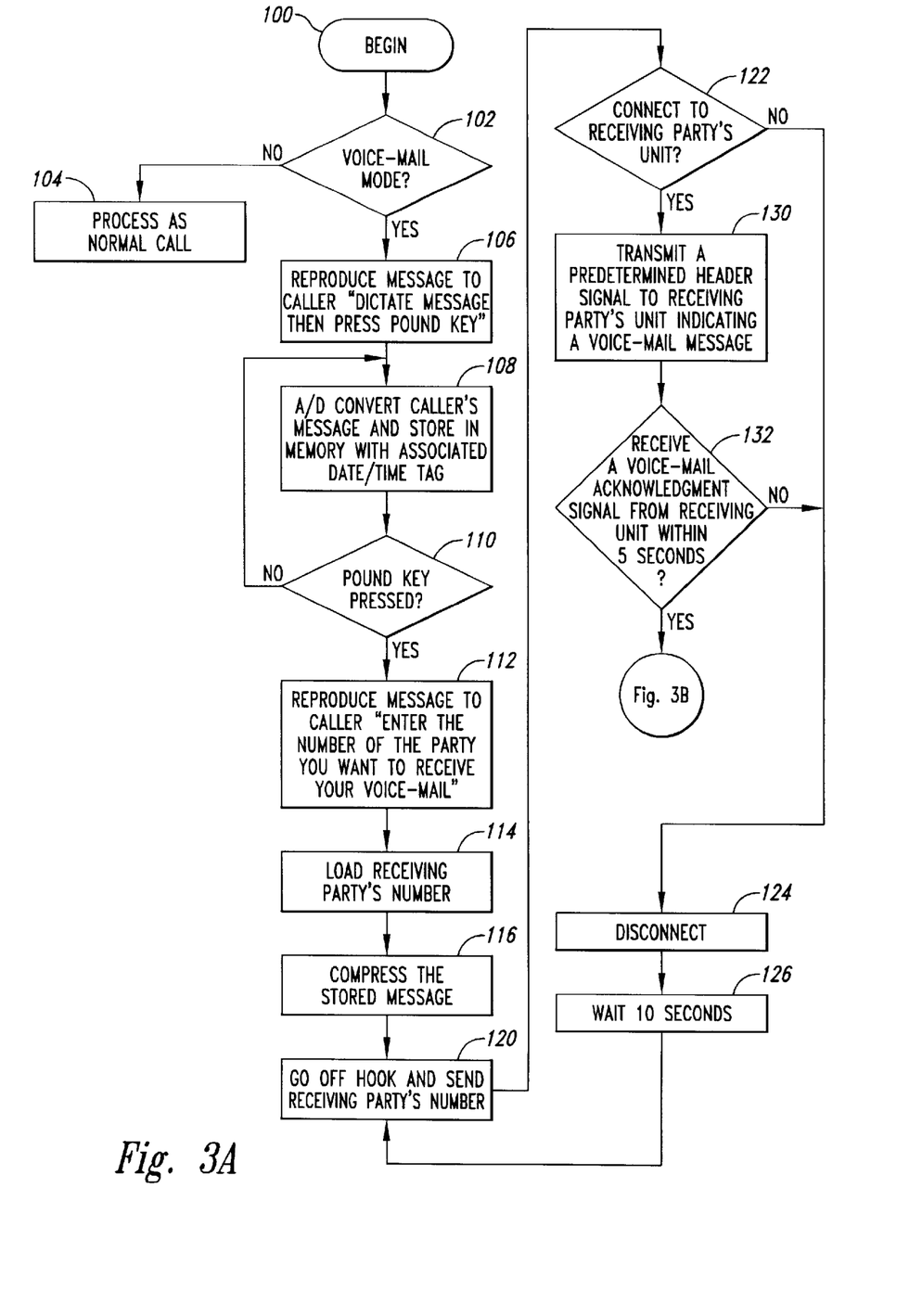
FIGS. 3A and 3B are a logic flow diagram illustrating the preferred embodiment of the logical sequence performed by the inventive voice-mail transmitter.
Figure 3B:
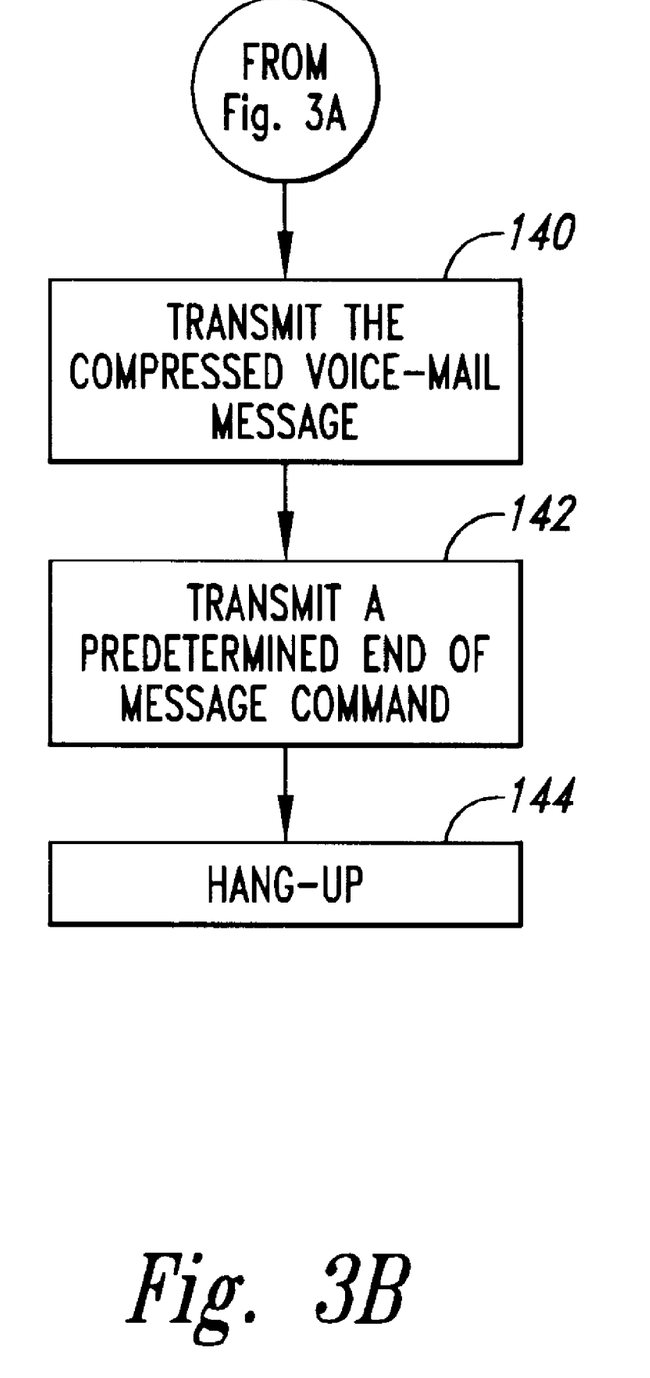

FIG. 3 is a logic flow diagram which details the logical steps performed by the CPU 50 in the course of its function as a voice-mail transmitter. From the begin mode 100 which may reflect the user pulling the handset 18 out of the cradle, and thereby activating hookswitch 20 "off-hook", the system first enters a decision block 102 to determine if the voice-mail mode has been selected. The voice-mail mode is selected by a user activating the voice-mail mode switch 30 as shown in FIGS. 1 and 2. If the voice-mail mode has not been selected, the logic allows a user to place a real time call as normal, as shown in block 104. If, however, the voice-mail mode has been activated, the system enters block 106 and transmits a message to the caller, namely "dictate message then press # key".

The user's message is then analog-to-digitally converted and stored in memory with an associated date/time tag at block 108. At decision block 110, it is determined whether or not the # key has been pressed. If it has not, the system reverts to the A/D—D/A conversion block 108. If, however, the # key 110 has been pressed, the system reproduces to the caller the message, "enter the number of the party you want to receive your voice-mail" at block 112. The user may then manually enter the receiving party's number via the keypad or, if the keypad is provided with an appropriate speed dial number, the user may simply activate the appropriate keypad, whereby the system then loads the receiving party's phone number at block 114.

To reduce the time that the telephone network is being accessed in order to transmit the voice-mail message, the user's stored digital message is then compressed by conventional digital data compression means at block 116.

The system then goes "off hook" and transmits over the telephone network the receiving party's telephone number, at block 120. The system then enters a decision block 122 to determine whether or not the receiving party's unit connects to the transmitted call. If it does not connect, the system then disconnects from the telephone network (goes off-hook at block 124) waits a period of time at block 126, and reinstitutes the off-hook and transmission of the receiving party's number block 120.

If, however, out of decision block 122 it is determined that the receiving party's unit has answered, block 130 is entered and the transmitting unit transmits a predetermined header signal to the receiving party's unit to thereby indicate that a voice-mail message is to be transmitted. The system then, at decision block 132, determines whether or not it has received a voice-mail acknowledgment signal from the receiving unit within a five second period. If the voice-mail acknowledgment signal is not received within the five second period, the system proceeds to block 124 to thereby disconnect and repeat the process.

If, however, at block 132 a receiving party acknowledgment signal is received, the system proceeds at block 140 to transmit the compressed voice-mail message. When a complete stored and compressed voice-mail message has been fully transmitted, the transmitter enters block 142 and transmits a predetermined end-of-message command signal. This results in a hang-up, at block 144 of the transmitting unit.

Figure 4:
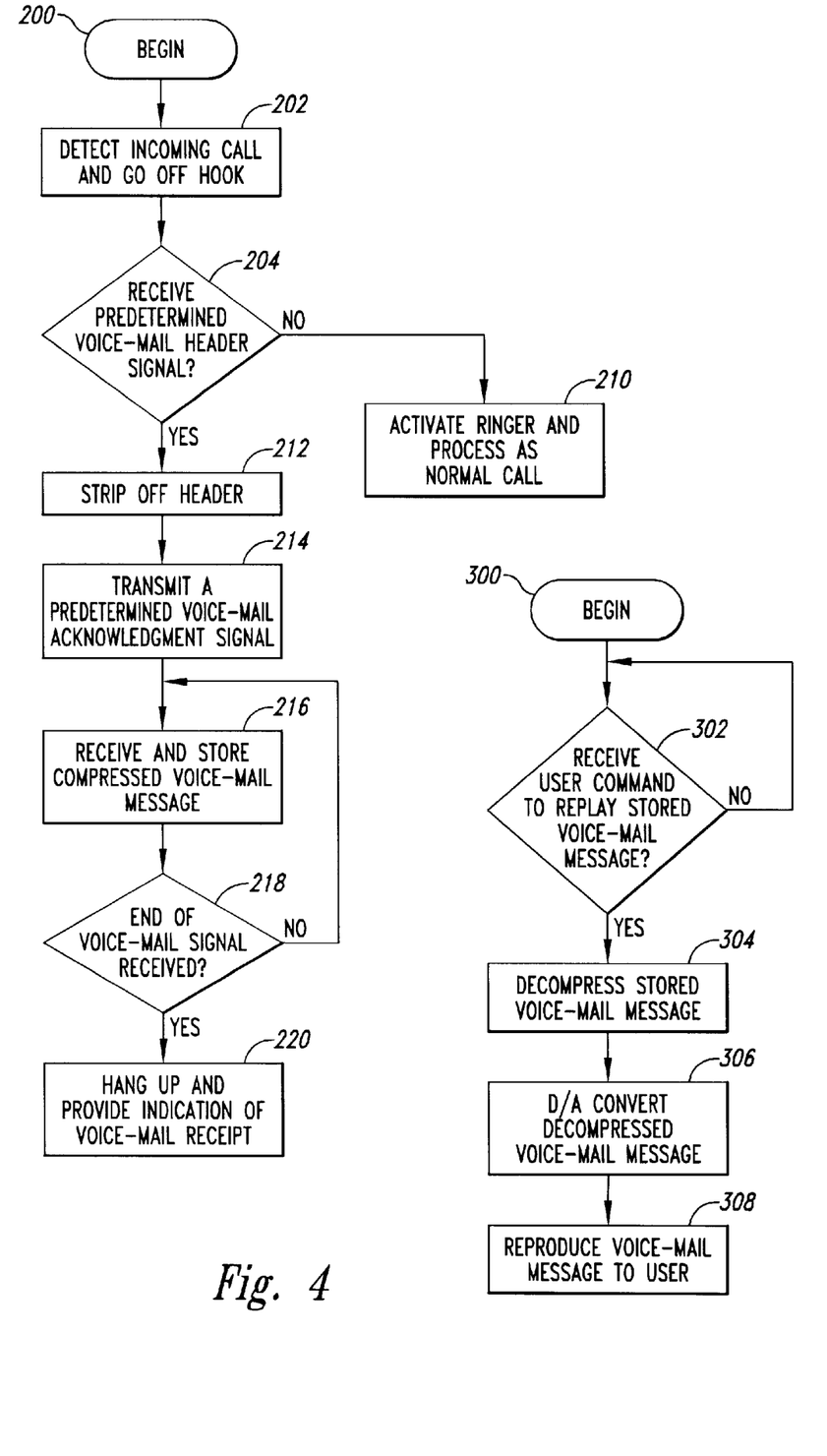
FIG. 4 is a logic flow diagram illustrating the preferred logic step sequence performed by the inventive voice-mail receiver.

Operation of the receiving portion of the voice-mail transceiver is illustrated with respect to the logic flow diagram set forth in FIG. 4.

Here, the receive mode begins at 200. First, the system operates to detect whether or not an incoming call has been detected in which event the receiving telephone unit goes "off-hook" at block 202. A decision block 204 is then entered to determine whether or not the received message contains the predetermined voice-mail header signal from the transmitting unit. If the received signal does not include the transmitted header signal, block 210 is entered and the system activates the ringer of the associated telephone unit and processes the incoming message as a standard real time telephone call.

If, however, at block 204 the predetermined voice-mail header is received, the system responds at block 212 to strip off the header.

After the header is stripped off of block 212, block 214 is entered and the receiving unit transmits a predetermined voice-mail acknowledgment signal back to the transmitting unit thereby letting the transmitting unit know that a voice-mail message may be transmitted.

At block 216, the receiving unit receives and stores the compressed voice-mail message from the calling unit. At decision block 218, the receiver determines whether or not an end-of-voice-mail signal has been received. If it has not, the system iterates to block 216. However, if an end-of-voice-mail signal is transmitted by the calling unit, the receiver responds at block 220 by hanging up (going on-hook) and providing an indication to the user at the receiver that a voice-mail message is waiting to be reviewed.

Operation of the voice-mail transceiver for purposes of allowing a user to review his or her voice-mail messages begins at 300. The system first determines at decision block 302 whether a user has commanded that the stored voice-mail messages be replayed. If no such command is received, the system iterates back to the input of block 302. However, upon a user indicating (as by the voice-mail replay button 36) that he or she wishes to replay any stored voice-mail messages, the system then enters block 304 and decompresses the stored voice-mail message. The decompressed voice-mail message is passed to block 306 where it is digital-to-analog converted back into the original voice-mail message as first recorded at the transmitter. The system then enters block 308 at which point the system reproduces the voice-mail message to the user.

In summary, a telephone control unit which includes a voice-mail transceiver has been described in detail. The transceiver allows the calling party to determine whether or not voice-mail or standard calls are desired. And, if a voice-mail transmission is desired, the caller's message is compressed to thereby reduce telephone network usage.

While a preferred embodiment of the invention has been described in detail, it should be apparent that many modifications and variations thereto are possible, all of which fall within the true spirit and scope of lo the invention.

I claim:

1. A telephone control unit in combination with a standard telephone handset for transmitting and receiving standard telephone transmissions and voice-mail messages to a called party at a single address comprising:
   a voice-mail transmitter, including a user command input device for requesting a voice-mail transmission rather than a standard telephone mode transmission, said voice-mail transmitter further including means for:
     a) detecting the status of said device and, in the event that a voice-mail message is to be sent;
     b) storing the voice-mail message in memory;
     c) compressing the stored voice-mail message;
     d) attaching a predetermined header signal to said compressed voice-mail message; and
     e) transmitting means for transmitting a user selected one of a standard telephone transmission said header and compressed voice-mail message over the telephone network to a user dialed voice-mail receiver at said single address; and
   a voice-mail receiver, including means for:
     1) receiving a message over the telephone network at said single address;
     2) detecting the presence of a predetermined voice-mail header in said message and, in response thereto;
     3) stripping off said voice-mail header;
     4) decompressing said voice-mail message; and
     5) transducing said voice-mail message upon user desired replay; and,
     6) processing said received message as a standard telephone transmission in the event that said voice-mail header is not received.

2. The telephone control unit of claim 1 wherein:
   said transmitter further includes an analog-to-digital converter for converting said voice-mail message to a digital signal format, with said digital signal then being stored digitally and processed through a digital compression algorithm before being transmitted over the telephone network with said attached header signal, and
   said receiver further includes a digital-to-analog converter for converting received digital messages into an analog signal format.

3. A communication system for permitting a calling party to initiate a transmission over a communication channel to a called party at a single address, said transmission being controlled by said calling party in a first mode to permit a real time calling party-to-called party communication and in a second mode to permit the calling party to transmit a recorded voice-mail message to said called party, the system comprising:
   a transmitter comprising:
     transmission means for establishing a call over the communication channel to said called party at said single address;
     selector means for allowing the calling party to select either said first or second mode;
     transmitter control logic means for:
       a) responding to said selector means being activated to said first mode to permit said calling party to initiate a transmission to said called party at said single address and engage in a real time communication with said called party, and
       b) responding to said selector means being activated to said second mode to permit said calling party to record a voice-mail message, said control logic then initiating a transmission to said single address and identifying that a voice-mail message is being transmitted and transmitting said recorded voice-mail message to said called party; and
   a receiver comprising:
     reception means for receiving a call over said communication channel to a called party at said called party's single address;
     detector means for detecting whether a received call is identified as a voice-mail message;
     receiver control logic means for:
       a) responding to said detector means having detected that a received call is a recorded voice-mail message to store said message and replay said voice-mail message to said called party on demand; otherwise
       b) processing said received call as a real time calling party-to-called party communication.

4. The communication system of claim 3 wherein:
   the transmitter control logic further includes means for applying an identifier tag to a transmitted voice-mail message; and
   said receiver detector means includes means for detecting said identifier tag in a received call and, in response thereto, identifying said received call as a voice-mail message.

5. The communication system of claim 4 wherein:
   said receiver further includes means to store said voice-mail message and to play said voice-mail message back on demand.

6. The communication system of claim 3 wherein:
   said transmitter further includes means for analog-to-digital converting said voice-mail message and storing and transmitting said voice-mail message in digital form; and
   said receiver further includes means for digital-to-analog converting a received voice-mail message in digital form prior to playback.

7. The communication system of claim 6 wherein:
   said transmitter further includes means for compressing said voice-mail message in digital form; and
   said receiver further includes means for decompressing a received voice-mail message in compressed, digital form prior to playback.

8. The communication system of claim 3 wherein:
   said transmitter further includes means responsive to a calling party activating said selector to said second mode to send one or more message prompts to said calling party indicating the appropriate procedure for recording the voice-mail message and entering the called party's address.

9. The communication system of claim 3 wherein:
said receiver further includes indicator means for indicating to a called party that a voice-mail message has been received.

10. The communication system of claim 3 wherein:
said transmitter further includes date and time tag means for associating a signal representative of the date and time with a voice-mail message.

11. The communication system of claim 10 wherein:
said transmitter further includes means for transmitting said signal representative of the date and time with the corresponding voice-mail message; and
said receiver further includes means for said called party to access said signal representative of the date and time.

12. A telephone control system permitting a caller to selectively transmit either a standard telephone transmission or a voice-mail message to a called party at the called party's single address, the system comprising:
selector means for permitting a caller to select either a standard telephone transmission or a voice-mail message;
processing means for storing a caller's voice-mail message in the event the caller selects a voice-mail message; and
transmission means for placing a call to said called party at said called party's single address and, in the event the caller has selected a voice-mail message, transmitting to the called party said stored voice-mail message, otherwise, processing said call as a standard telephone transmission.

13. The telephone control system of claim 12 wherein:
said processing means includes means to apply an identifier tag to a stored voice-mail message prior to transmission;
said telephone control system further includes:
reception means for receiving and processing calls to said calling party at said single address, said reception means including means to detect said identifier tag and, in response thereto, process said call as a voice-mail message, otherwise processing said call as a standard telephone transmission.

14. The telephone control system of claim 13 wherein:
said reception means, upon detecting said identifier tag and processing said call as a voice-mail message, further includes means to store said voice-mail message and to play said voice-mail message back to said called party on demand.

15. The telephone control system of claim 12 wherein:
said processing means includes means for analog-to-digital converting a caller's voice-mail message and storing and transmitting said message in digital form.

16. The telephone control system of claim 15 wherein:
said processing means further includes means to compress said analog-to-digital voice-mail message.

17. The telephone control system of claim 13 wherein:
said processing means includes means for analog-to-digital converting a caller's voice-mail message and storing and transmitting said message in digital form; and
wherein said reception means in processing said call as a voice-mail message includes digital-to-analog converter means for converting said digital voice-mail message to an analog signal.

18. The telephone control system of claim 13 wherein:
said processing means includes means for analog-to-digital converting a caller's voice-mail message and storing and transmitting said message in digital form; and
wherein said reception means in processing said call as a voice-mail message includes digital-to-analog converter means for converting said digital voice-mail message to an analog signal; and
said reception means further including means for decompressing said digital voice-mail message.

19. The telephone control system of claim 13 wherein:
said reception means further includes indicator means for indicating to a called party that a voice-mail message has been received.

20. The telephone control system of claim 12 wherein:
said processing means further includes means for associating a signal representative of the date and time with a voice-mail message.

21. The telephone control system of claim 13 wherein:
said processing means further includes means for associating a signal representative of the date and time with a voice-mail message, and said transmission means includes means to transmit said signal representative of the date and time with said voice-mail message,
and wherein said reception means further includes means permitting the called party to access said signal representative of date and time.

22. A method for use in a telephone control system permitting a caller to selectively transmit either a standard telephone transmission or a voice-mail message to a called party at the called party's single address, the method comprising the steps of:
permitting a caller to select either a standard telephone transmission or a voice-mail message;
storing a caller's voice-mail message in the event the caller selects a voice-mail message; and
placing a call to said called party at said called party's single address and, in the event the caller has selected a voice-mail message, transmitting to the called party the stored voice-mail message, otherwise processing said call as a standard telephone transmission.

23. The method of claim 22 further comprising the steps of:
providing an identifier tag to a stored voice-mail message, prior to voice-mail message transmission;
providing reception means, said reception means performing the steps of receiving and processing calls to said called party at said single address, detecting said identifier tag and, in response thereto, processing said calls as a voice-mail message, otherwise processing said call as a standard telephone transmission.

24. The method of claim 23 including the further step of:
upon said reception means detecting said identifier tag and processing said call as a voice-mail message, storing said voice-mail message and playing said voice-mail message back to said called party on demand.

25. The method of claim 22 including the further step of:
analog-to-digital converting a caller's voice-mail message and storing and transmitting said message in digital form.

26. The method of claim 25 including the further step of:
compressing said analog-to-digital voice-mail message.

27. The method of claim 23 including the further steps of:
analog-to-digital converting a caller's voice-mail message and storing and transmitting said message in digital form;
and wherein said reception means performs the steps of:
in processing said call as a voice-mail message, digital-to-analog converting said digital voice-mail message to an analog signal.

28. The method of claim 23 including the further steps of:

compressing said analog-to-digital voice-mail message prior to transmission, and wherein said reception means performs the further step of: decompressing said digital voice-mail message prior to playback.

29. The method of claim 22 wherein said reception means performs the further step of:

indicating to a called party that a voice-mail message has been received.

30. The method of claim 22 including the further step of: associating a signal representative of the date and time with a voice-mail message.

31. The method of claim 23 including the further steps of:

associating a signal representative of the date and time with a voice-mail message, and transmitting said signal representative of the date and time with said voice-mail message;

and wherein said reception means performs the further step of permitting the called party to access said signal representative of date and time.

* * * * *